Nov. 28, 1967  H. C. STAPLES  3,355,136
ADJUSTABLE SUPPORT DEVICE FOR A VEHICLE
Filed Sept. 13, 1965
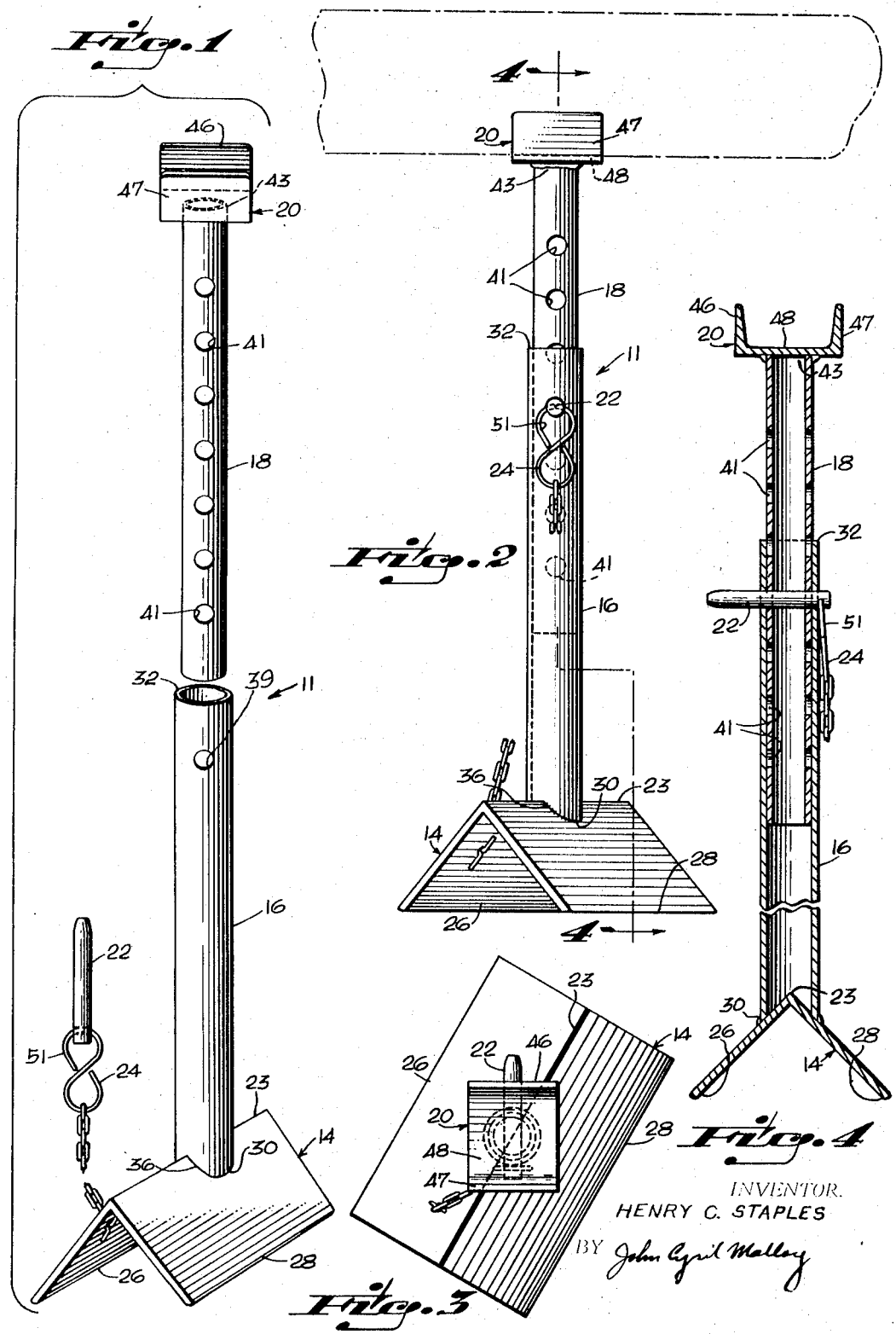
INVENTOR.
HENRY C. STAPLES
BY John Cyril Malloy 3,355,136
ADJUSTABLE SUPPORT DEVICE FOR A
VEHICLE
Henry C. Staples, 701 W. 27th St.,
Hialeah, Fla. 33013
Filed Sept. 13, 1965, Ser. No. 487,001
1 Claim. (Cl. 248—352)

ABSTRACT OF THE DISCLOSURE

This invention provides a support device for a raised vehicle which includes an angle beam platform to rest on a support surface, a standard on the platform, a telescopic member in the standard, and means to extend the member relative to the standard and hold it in an extended position with the member having a cradle on the distal end to hold the bumper or the lip of a downwardly extending projection of the automobile.

This invention relates to an adjustable support device for a vehicle which is adapted to be applied beneath a vehicle to support it after it has been raised by a bumper jack.

As is perhaps well known, bumper jacks, that is, jacks which comprise a standard with a movable member connected thereto and jack means for moving the member relative to the standard, are quite common and are utilized by connecting an arm on the member under the bumper and then jacking it upwardly to a height such that the springs of the automobile suspension are extended and the tire is slightly off the ground. It is well recognized that when an automobile is in such a position there is a danger and even a tendency for the automobile to roll backwardly or forwardly and fall off the bumper jack causing the jack to be sprung outwardly quite often injuring a person using it or others in the area.

This invention provides an inexpensive adjustable support device for connection to the bumper of an automobile after it has been raised by such a bumper jack to hold it in the raised position so that one working on the automobile around the bumper jack will not be subjected to injury either by the bumper jack being sprung from underneath the automobile or by the automobile falling upon him.

It is another object of this invention to provide a support device for a vehicle which has been raised by a bumper jack which is relatively inexpensive to manufacture, simple in construction, strong and sturdy and well adapted for the purposes for which it is intended.

In accordance with these and other objects which will become apparent hereinafter, the instant invention will now be described with reference to the accompanying drawings in which:

FIGURE 1 is an exploded perspective view of the support device;

FIGURE 2 is an elevation view illustrating the cradle of the support device in engagement with the bumper of an automobile, shown in phantom lines, and the arrangement of the base on a support surface when the support device is in use;

FIGURE 3 is a plan view of the support device of FIGURE 2; and

FIGURE 4 is a cross sectional view taken along the planes of the line 4—4 and looking in the direction of the arrows.

Referring more particularly to the drawings, wherein like reference characters designate like or corresponding parts throughout the different views and referring particularly to FIGURE 1, there is shown the support device generally designated by the numeral 11 and including the support platform 14, a standard 16 supported on the platform and an extensible member 18 for telescopic engagement with the standard, said member 18 having a cradle 20 mounted to the distal end thereof, and a chain carrying pin 22 for passage into the holes along the member 18 and the hole of the standard 16 with one end of the chain 24 being connected to the pin 22 and the other end being connected to the platform.

As is apparent in FIGURES 1 and 2, the platform is of an angle beam with the apex 23 of the included angle of the beam being in an inverted position and the outer edges 26 and 28 engaging and supporting the platform, the outer edges being symmetrical along the angle line of symmetry, and the platform being parallelogrammatic in plan. The standard 16 is of tubular construction having a lower first end 30 and an upper second end 32. The first end is provided with a V-shaped diametrical notch 36 sized to seat on the line of symmetry, the apex, of the platform beam with the edges of the notch resting on the inclined surfaces of the platform circumposing a circular area on the platform when viewed in plan. The other end 32 of the standard is provided with a diametrical hole 39 adjacent the end which passes through the side walls of the standard. The axis of the hole is in a plane parallel to the projection in plan of the platform and is diagonal with respect to the parallelogrammatic projection in plan of said platform. The extension member or bar 18 is adapted for telescopic engagement and, in this embodiment, telescopic receipt in the standard. The member is provided with a plurality of diametrical parallel aligned holes, such as 41, at spaced intervals along the length thereof.

To the distal end 43 of the extension 18 the cradle is mounted on the member with the flanges 46 and 47 extending away from the platform and with the center line of the web 48 being transverse of the axis of the holes in the member when viewed in plan and, consequently, generally diagonal with respect to the projection of the platform in plan. A pin, previously designated by the numeral 22, is provided for passage through the holes of the standard and the member to hold the member in any predetermined fixed position relative to the standard when in an extended position for securing the member in the standard when in the extended position seen in FIGURE 2. The member is of a length relative to that of the standard such that it is adapted to be, for all practical purposes, wholly housed therein with the cradle resting on the upward end of the standard and the member depending slidably within the standard for a collapsed passage of the pin through the uppermost hole of the member to secure the member in the collapsed state. A flexible ligament or chain is provided to connect the pin to the platform. The connection link 51 of the pin and chain is enlarged relative to the diameter of the hole to act as a stop means to limit penetration of the pin into the holes when aligned.

The operation is apparent in FIGURE 2; when the automobile has been raised, the support device is positioned so as to cradle the bumper and, therefore, the device is elongated to the correct position and the pin 22 passed through the holes which most nearly permit of support of the automobile in the event the bumper jack gives way or is relaxed so that the weight is transferred to the instant device.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claim so as to embrace any and all equivalent apparatus and articles.

What is claimed is:

An adjustable support device for a vehicle which has been raised by a bumper jack to hold it in a raised position comprising; an angle beam platform to rest on a support surface beneath a vehicle with the apex of the included angle in an inverted position and the outer edges engaging the support surface, said platform being symmetrical along the apex and parallelogrammatic in plan; a tubular standard having a first end, said first end being integrally secured to said platform and including a second end and a V-shaped diametrical notch seated on the apex of the beam platform with the edges of the notch on the platform circumposing a circle centrally on the platform as seen in plan and supporting the standard above the beam platform; and a diametrical hole through the side walls of the standard adjacent the second end and, the axis of said hole being in a plane parallel to the projection in plan of the platform and diagonal with respect to alternate corners of the parallelogrammatic projection; an extension member telescopically received in the standard and having a plurality of parallel aligned diametrical holes at spaced intervals therealong; a channel form cradle mounted to the distal end of the member with the flanges extending away from the platform and the center line of the web being transverse of the axis of the holes in the member and said axis of the holes in the member extending diagonally with respect to alternate corners of the projection in the same manner as the axis of the hole in the side wall of the standard; a pin sized for passage through the holes of the standard and member to hold the member in a fixed position relative to the standard when in an extended position and to secure the member in the standard when in a telescoped position, said member being of a length relative to that of the standard such that, when it is in the collapsed state with the cradle abutting the said second end, the extension depends in the standard and the distal most hole of the member is aligned with the hole of the standard; and flexible ligament means to connect the pin to the platform whereby forward or rearward movement of a vehicle supported on said support device will tend to urge one of said diagonal corners of said base into the support surface and the edge of the base extending therefrom into the support surface to appreciably resist movement of said vehicle.

References Cited
UNITED STATES PATENTS

| | | | |
|---|---|---|---|
| 2,350,701 | 6/1944 | Stueland | 248—352 X |
| 2,439,854 | 4/1948 | Lipski | 248—354 |
| 2,524,955 | 10/1950 | Brozell | 248—163 |
| 2,529,292 | 11/1950 | Greenfield | 248—354 |
| 2,671,680 | 3/1954 | Stevens | 287—58 X |
| 2,777,660 | 1/1957 | Albrecht | 248—354 |
| 2,820,626 | 1/1958 | Hedeen | 248—356 X |
| 2,979,304 | 4/1961 | Teel | 248—354 |
| 3,173,644 | 3/1965 | Burfiend | 248—356 |

ROY D. FRAZIER, *Primary Examiner.*

A. FRANKEL, *Assistant Examiner.*